United States Patent [19]

Gamarra

[11] Patent Number: 5,149,736
[45] Date of Patent: Sep. 22, 1992

[54] HEAT RESISTANT GEL COMPOSITIONS

[75] Inventor: Jose P. Gamarra, Union City, Calif.

[73] Assignee: Raychem Corporation, Menlo Park, Calif.

[21] Appl. No.: 519,617

[22] Filed: May 7, 1990

Related U.S. Application Data

[60] Division of Ser. No. 217,798, Jul. 12, 1988, Pat. No. 4,942,370, which is a continuation-in-part of Ser. No. 72,309, Jul. 13, 1987, abandoned.

[51] Int. Cl.$^5$ .............................................. C08L 53/00
[52] U.S. Cl. ................................... 524/490; 524/505; 427/407.1; 427/409; 174/93
[58] Field of Search ..................... 427/407.1, 409, 431; 524/505, 490

[56] References Cited

U.S. PATENT DOCUMENTS

| | | | |
|---|---|---|---|
| 4,610,738 | 9/1986 | Jervis | 174/92 |
| 4,701,574 | 10/1987 | Shimirak et al. | 174/92 |
| 4,716,183 | 12/1987 | Gamarra et al. | 524/505 |

Primary Examiner—John C. Bleutge
Assistant Examiner—Mark D. Sweet
Attorney, Agent, or Firm—A. Stephen Zavell; Herb Burkard

[57] ABSTRACT

This invention provides styrene-ethylene-butylene-styrene triblock copolymer-oil compositions which are temperature resistant and nonmeltable. They have a viscosity at 200° C. of at least 200 poise. The compositions can be molded under pressure at elevated temperatures.

5 Claims, 1 Drawing Sheet

HEAT RESISTANT GEL COMPOSITIONS

This application is a divisional of copending application Ser. No. 07/217,798 filed Jul. 12, 1988, now U.S. Pat. No. 4,942,270, which is a continuation-in-part application of Ser. No. 07/072,309 filed Jul. 13, 1987, now abandoned, the disclosures of which are incorporated herein by reference.

FIELD OF THE INVENTION

This invention relates to styrene-diene block copolymer compositions containing at least about 70% oil, useful for example in providing environmental sealing or protection especially in the cable accessories industry.

BACKGROUND OF THE INVENTION

Gel compositions comprising styrene-diene block copolymers and hydrocarbon oils wherein the copolymer constitutes up to about 30 parts by weight and the oil constitutes at least about 70 parts by weight are known in the art as well as various methods of preparing these compositions. Examples of such compositions and their preparation are illustrated in U.S. Pat. Nos. 4,369,284 and 4,618,213 to Chen; 3,827,999 to Crossland; 4,176,240 to Sabia; 3,485,787 to Haefele; and 3,676,384 to Lindlof; and in my copending application Ser. No. 801,018 filed Nov. 22, 1985 (equivalent to published European application 0224389) and now granted as U.S. Pat. No. 4,716,183. The disclosures of these patents and the copending application are incorporated herein by reference. The various compositions within this class of gels have different combinations of physical properties depending on the use intended for the gel.

A styrene-diene block copolymer of particular interest in the present invention is a poly (styrene-ethylene-butylene-styrene) triblock copolymer (SEBS triblock copolymers) which, when combined with sufficient plasticizer, such as a hydrocarbon oil, provides a gel composition having a cone penetration at least about 50, for example in the range of about 50 to at least 290, say about 300 ($10^{-1}$ mm) (ASTM D217-82) and an ultimate elongation of at least 200% (ASTM D412). For example, in Chen U.S. Pat. No. 4,369,284 these triblock copolymers were melt blended with oils to produce a gel-like material which is meltable and useful for cast molding of shaped articles.

I have found that it is desirable to use these SEBS triblock copolymer-oil compositions in various applications, such as in U.S. Ser. No. 698,643 filed Feb. 6, 1985, the disclosure of which is incorporated herein by reference. However, these materials do not have satisfactory resistance to higher temperatures, i.e., at higher temperatures such as 90° C. or higher and in some cases 100° C. or higher, these materials may slump or flow in a manner that causes the material to lose its original shape and its original function. At these higher temperatures some of the prior art compositions also slump, flow and loose oil content which contaminates surrounding equipment.

Therefore, it is an object of this invention to produce SEBS triblock copolymer-oil compositions of the above type having heat resistant characteristics so that they will not lose their dimensional integrity at elevated temperatures.

In my U.S. Pat. No. 4,716,183 heat resistant gels are made by mixing a styrene-diene block copolymer and a hydrocarbon oil at an elevated temperature sufficient to cause the block copolymer to melt and disperse in the oil, and optionally also by crosslinking the resulting material by electron beam radiation. It is an object of this invention to provide improved heat resistant gels without the necessity of using electron beam radiation.

The patents cited above do not meet these objectives and do not disclose the desired heat resistant compositions. Crossland discloses similar block copolymers but are polyisoprene or polybutadiene block copolymers which are melt blended with oils at a temperature of 50° to 250° C. to produce compositions which are meltable and castable; i.e. they have a very low viscosity at higher temperatures such as 200° C. Haefele contains disclosure similar to Crossland wherein the block copolymers and oil are melt blended at 160° C., and Lindlof contains similar disclosure wherein the polymers are melt blended with the oil at 175° C.

SEBS copolymers have typically not been used with high loadings of oil but have usually been limited to about 50 parts by weight oil and about 50 parts by weight SEBS block copolymer, as illustrated in U.S. Pat. No. 4,556,464 to St. Claire.

Chen, U.S. Pat. No. 4,369,284, however, uses 100 parts by weight SEBS block copolymers with about 300 to about 1600 parts by weight oil to produce meltable, castable compositions by melt blending at about 150° C. to 200° C. Chen teaches that the use of the SEBS block copolymer with low molecular weight oils melt blended at the desired temperature produces the meltable, castable composition having at least 1600% elongation and tensile strengths in the range of about 12 to about 145 psi.

There is no disclosure or suggestion in these cited references of any composition or how to obtain any composition of these types which would be heat resistant and have a viscosity of at least 200 poise at 200° C.

SUMMARY OF THE INVENTION

In one aspect this invention provides a composition comprising:

about 2 to about 30 parts by weight of a poly (styrene-ethylene-butylene-styrene) triblock copolymer having a styrene to ethylene-butylene block ratio of about 27 to 35 styrene blocks to about 65 to 73 ethylene-butylene blocks, and having a molecular weight of at least 100,000; and about 70 to about 98 parts by weight of a plasticizer, for example a hydrocarbon oil;

wherein the triblock copolymer and the plasticizer have been (a) melt blended and (b) at sufficiently high temperature or under sufficiently high shear have been treated to cause the composition to have a cone penetration of at least about 50 for example in the range of about 50 to at least 290, say about 300 ($10^{-1}$ mm), an ultimate elongation of at least about 200% and a viscosity at 200° C. of at least 10 poise, often at least 200 poise.

In general, I prefer that the heat treatment be at a temperature of at least 180° C. The heat-treatment may be simultaneous with melt blending of the components or it may occur subsequently, for example as part of an extrusion or melting step or may be carried out alone. For many applications I prefer that the temperature treatment is accompanied by shear.

In another aspect this invention provides a method of preparing a composition comprising:

about 2 to about 30 parts by weight of a poly (styrene-ethylene-butylene-styrene) triblock copolymer having a styrene to ethylene-butylene block ratio of about 27 to 35 styrene blocks to about 65 to 73 ethylene-butylene blocks, and having a molecular weight of at least 100,000; and about 70 to about 98 parts by weight of a plasticizer, for example a hydrocarbon oil;

wherein the triblock copolymer and the plasticizer have been melt blended or a mixture thereof has been moulded or extruded at sufficiently high temperature to cause the composition to have a cone penetration of at least about 50 for example in the range of about 50 to at least 290, say about 300 ($10^{-1}$ mm), an ultimate elongation of at least about 200% and a viscosity at 200° C. of at least 10 poise;

which comprises melt blending the triblock copolymer and the plasticizer or moulding or extruding a mixture thereof at a temperature above about 180° C.

In another aspect this invention provides a method of preparing a composition comprising:

about 2 to about 30 parts by weight of a poly (styrene-ethylene-butylene-styrene) triblock copolymer having a styrene to ethylene-butylene block ratio of about 27 to 35 styrene blocks to about 65 to 73 ethylene-butylene blocks, and having a molecular weight of at least 100,000; and about 70 to about 98 parts by weight of a plasticizer, for example a hydrocarbon oil;

wherein the triblock copolymer and the plasticizer have been melt blended or a mixture thereof has been moulded or extruded under sufficiently high shear to cause the composition to have a cone penetration of at least about 50 for example in the range of about 50 to at least 290, say about 300 ($10^{-1}$ mm), an ultimate elongation of at least about 200% and a viscosity at 200° C. of at least 10 poise;

which comprises high shear blending the triblock copolymer and the plasticizer or high shear moulding or extruding a mixture thereof at a temperature above about 100° C.

In many cases, the triblock copolymer will have a styrene to ethylene-butylene block ratio of 29 to 35 styrene blocks to 65 to 71 ethylene-butylene blocks. An example is Kraton G-1651 (trade mark) marketed by Shell Oil Company.

DESCRIPTION OF THE INVENTION

The compositions of the present invention comprise SEBS triblock copolymer-oil (or other plasticizer) compositions comprising about 2 to about 30 parts by weight block copolymer and about 70 to about 98 parts oil. In general, it is preferred that these compositions contain about 5 to about 30 parts by weight block copolymer and 70 to 95 parts oil and it is most preferred for some applications that the composition comprise between about 5 and about 25 parts by weight triblock copolymer and about 95 to about 75 parts by weight oil.

The SEBS triblock copolymer-oil compositions of this invention have a cone penetration at least about 50 ($10^{-1}$ mm) (ASTM D217-82) and an ultimate elongation of at least 200% (ASTM D412). Preferred compositions will have cone penetration in the range of about 50 to about 300 often from 50-200 ($10^{-1}$ mm) and ultimate elongation of at least about 200%, preferably in the range of about 200 to about 1200%, more preferably between about 300 and 1100% and most preferably between about 400 and 1100%.

The heat resistant compositions of the present invention have a viscosity at 200° C. of at least 10 poise, particularly at least 100 poise, preferably at least 200 poise, more preferably at least 400 poise and most preferably at least 500 poise at 200° C. In general, there is an increase, often a steep increase, in viscosity as the concentration of the SEBS polymer is increased. Depending on the precise materials, softer compositions may be expected to contain 5-20% by weight of SEBS, and the preferred harder compositions 10-30% by weight of SEBS. Brookfield viscosities may be obtained for the softer compositions and for harder compositions dynamic viscosity measurements may be carried out on a Rheometrics Mechanical Spectrometer (RMS-605).

The SEBS triblock copolymers useful in the present invention have a ratio of polystyrene blocks to polyethylenebutylene blocks in the range of about 27 to 35 styrene blocks to 65 to 71 ethylene-butylene blocks, more preferably in the range of 32 to 34 styrene blocks to 66 to 68 ethyene-butylene blocks, and most preferably the ratio will be 33 styrene blocks to 67 ethylene-butylene blocks. In general, a decrease in tensile strength and other mechanical properties may be expected when reducing the polystyrene content, say from 32%. This may be due to the resulting reduction in molecular weight. The average molecular weight of the SEBS triblock copolymer is important for the present invention, and values given in this specification are weight average molecular weights determined in solution by gel permeation chromatography standardized with reference to and expressed as polystyrene. I have found that the total molecular weight of the SEBS triblock copolymer is of greater importance than the ratio between the molecular weights of the polystyrene and ethylene-butylene blocks. This has not been appreciated in the prior art. I prefer a total molecular weight of more than about 100,000, and preferably one in the range of 100,000 to 500,000, more preferably one in the range of about 150,000 to about 400,000, most preferably in the range of about 200,000 to about 300,000 and in some applications it is preferred that the SEBS triblock copolymer have a molecular weight in the range of about 250,000 to about 280,000. Preferred molecular weights of the polystyrene end blocks and of the ethylene-butylene center blocks can be calculated from the preferred total molecular weight and preferred ratios given above.

In general, the plasticizer should be chosen bearing in mind its solubility parameters, which will usually be a function of molecular weight. Although I do not wish to be bound by any theory, I believe that the reason is as follows. When a SEBS copolymer is heated above the Tg of the polystyrene domains, those domains are disrupted and polystyrene segments flow from one such domain to another, through the thermodynamically incompatible ethylene-butylene phase. If the SEBS polymer is heated in the presence of a plasticizer having a solubility parameter (with respect to polystyrene) lower than that of the ethylene-butylene midblock, i.e. being less compatible with polystyrene, then the tendency will be greater for polystyrene segments to agglomerate back together into polystyrene domains. Once this happens, even higher energy will be required for further disruption. Hence the great heat stability after initial high heating.

The oils useful in the composition of the present invention may be oils disclosed in the above patents and copending applications where the oil has a molecular weight in the range of about 400 to about 2500, preferably about 420 to about 2000, and most preferably about 450 to about 1500. It is also preferred that the oil have a solubility parameter in the range of about 6.0 to about 8.5 and preferably in the range of about 6.5 to about 8.0, typically 6.5 to 7.8. Particularly preferred oils include paraffinic and/or naphthenic oils, synthetic polyalphaolefin oils, polypropylene oils and polybutene oils having these properties. Blends of two or more of these oils may be used. In general, the solubility parameter of the oil will decrease (as is desired) with an increase in molecular weight. In the case of paraffinic/naphthenic oils, the solubility parameter decreases for increasing paraffin content.

The heat resistant nonmeltable compositions of the present invention may be prepared by mixing the SEBS triblock copolymer and the oil, or other plasticizer, in processes similar to those recited in the patents and copending applications cited above; however, the prior art methods do not provide a transition of the SEBS triblock copolymer-oil composition from a meltable, pourable or castable composition to a heat resistant, nonmeltable composition. The heat resistant, nonmeltable compositions of the present invention are obtained by providing sufficient energy into the composition during mixing and preparation to accomplish this transformation into a heat resistant, nonmeltable composition. A clear and/or homogeneous mix is in general produced before this transformation, and it is only this precursor mix that has been produced by prior art methods, and then only for some of the materials referred to herein. The energy required can be provided either by high temperature melt blending or high shear blending at lower temperatures. It has been found that the compositions of the present invention can be prepared by melt blending at temperatures above 180° C. to achieve the required transformation of the composition into a heat resistant, nonmeltable composition. The time required will vary depending on the temperature, degree of mixing, ratio of polymer to oil and other factors. Preferably the compositions of the present invention are prepared by melt blending at at least 190° C. and more preferable at temperatures of about 200° C. and above. It is most preferably to use temperatures above 200° C. The melt blending is preferably performed in the range of 180° to 270° C., more preferably in the range of 190° to 265° C., and most preferably between 200° and 260° C.

Another method by which the heat resistant, nonmeltable compositions of the present invention can be prepared is by high shear mixing at lower temperatures. The required high shear to accomplish the transformation of the SEBS triblock copolymer-oil composition into the heat resistant, nonmeltable composition of this invention can be accomplished in for example a Banbury or Brablender type mixer typically used for preparation of elastomers, rubber compositions, or plastic compositions. The term "high shear" is used in the context of the present invention relative to the energy input required for mixing SEBS triblock copolymers and oil which are normally melt blended at very low shear energy or power inputs. The "high shear" mixing according to the present invention can be conducted at a temperature of at least 100° C., preferably at least 110° C., and more preferably at least 120° C.

The heat resistant, nonmeltable SEBS triblock copolymer oil compositions of the present invention have various uses as disclosed in the patents and patent applications cited above wherein the compositions of the present invention provide improved performance because of the high temperature resistant, nonmeltable properties of the compositions of the present invention. The compositions of the present invention will find other uses such as but not limited to use as pressure sensitive adhesives where performance is desired at higher temperatures (see St.Clair, *Adhesives Age*, March 1980, pp. 30–36 .)

In particular, the compositions may provide environmental sealing or protection particularly in the cable accessories industry. For example, the compositions may be used to seal between a substrate to be protected (such as a cable or an electrical terminal) and a housing that surrounds it, or between two parts of such a housing Thus the composition allows a sealed enclosure to be formed simply by bringing the composition into contact with the substrate, or with a housing, and optionally maintaining the composition under compression. Thus, heat-shrinkable articles (commonly used as cable accessories) may be avoided In the following examples, the SEBS triblock copolymer is Kraton G1651 (trade mark), available from Shell Oil Co. and having a styrene copolymer to ethylenebutylene copolymer block ratio of 33 to 67.

EXAMPLE 1

Three compositions are formed each using 20 parts by weight Kraton G1651 and one part by weight Irganox 1010 (trade mark) stabilizer. Each of the three compositions is formed using 79 parts of a polybutene oil. The composition is formed by adding approximately one-half of the oil to the polymer and melt blending in a mixer at a temperature between about 180° C. and 220° C., until the polymer is well dispersed in the oil and then the remaining one-half of the oil is added and mixed for about one hour. The actual temperature used depends on the oil used. The temperature is elevated until a clear gel is observed and is then further heated so that the transition to a nonmeltable temperature-resistant gel takes place. The first composition is made using a polybutene Indopol L-50 (trade mark) available from Amoco and having a molecular weight of about 420. The transition for this composition can be seen as low as 180° C. and the viscosity of this composition at 200° C. is about 1300 poise. The second composition is prepared using Indopol H-50 (trade mark) having a molecular weight of about 750. The viscosity of this second composition at 200° C. is about 800 poise. The third composition is prepared using Indopol H-300 (trade mark) having a molecular weight about 1290 and the viscosity of the resulting composition at 200° C. is about 1200 poise.

EXAMPLE 2

In this example, 20 parts Kraton G-1651 is premixed in a Henschel mixer with about 40 parts oil for about 4 minutes then added to a Banbury f-80 mixer together with an additional 39 parts oil and 1 part Irganox 1010 and mixed at 110° C. for about 8 minutes. The total power input is abut 0.08 kw per pound (0.176 kW per Kg) of composition. The composition is dumped from the banbury and mixed through an extruder for approximately an additional 5 minutes and extruded through a 200 mesh screen to produce the final product. The oil in this example is Drakeol 34 (trade mark) which is a paraffinic/naphthenic oil having a paraffin/naphthene ratio of 72/28 and a molecular weight of about 490. The final product is collected and molded using heat and pressure to form a shaped article which is nonmeltable and is heat resistant.

It has been found that the compositions of the present invention can be used by injection molding the composition to form desired shaped articles. While these compositions are not meltable or castable and have very high viscosities even at elevated temperatures, they can be molded under pressure at elevated temperatures. In some cases the shaped articles can be formed under moderate pressures with long heat soak times and in others the shaped articles can be formed under high pressure with shorter times required at elevated temperatures. The term "nonmeltable" is used herein to mean that the compositions begin to degrade, decompose or break down in some manner before they reach a temperature at which the composition will melt and become pourable.

The invention is further illustrated with reference to the accompanying drawings, in which:

Figure 1:
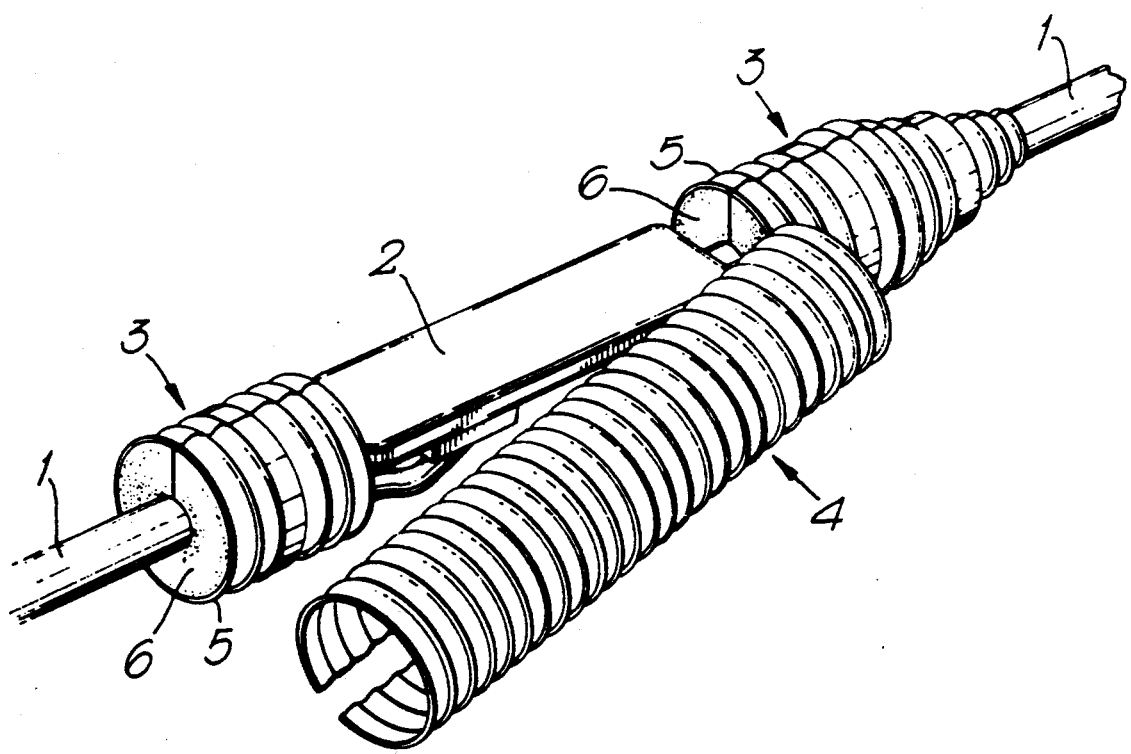
FIG. 1 shows a partially disassembled splice case around a cable splice.

Two cables 1, for example telecommunications cables, are joined at a splice region 2. The splice region is sealed by means of a splice case comprising end pieces 3 around the cables at each side of the splice and a central portion 4 that bridges the end pieces. It is shown prior to positioning around them.

The end pieces 3 may comprise supports or casings 5 containing a sealing material 6. The sealing material may comprise the composition of the invention. This design of splice case is marketed by Raychem under the trade mark TRAC, and is disclosed and claimed in U.S. Pat. No. 4,701,574 (Raychem), the disclosure of which is incorporated herein by reference.

What is claimed is:

1. A method of environmentally protecting a substrate which comprises:
    surrounding the substrate with a housing such that a composition is positioned between the substrate and the housing, the composition comprising:
    about 5 to about 30 parts by weight of a poly(styrene-ethylene-butylene-styrene) triblock copolymer having a styrene to ethylene-butylene block ratio of about 27 to 35 styrene blocks to about 65 to 73 ethylene-butylene blocks, and having a molecular weight of at least 100,000; and
    about 70 to about 95 parts by weight of a plasticizer the plasticizer comprises a hydrocarbon oil having a molecular weight of about 400 to about 2,500 and a solubility parameter of about 6.0 to 8.5;
    wherein the triblock copolymer and the plasticizer have been (a) melt blended and (b) at sufficiently high temperature or under sufficiently high shear have been treated to cause the composition to have a cone penetration of at least about 50 ($10^{-1}$ mm), an ultimate elongation of at least about 200% and a viscosity of 200° C. of at least 100 poise; and
    bringing the composition and the substrate into contact with each other.

2. A method according to claim 1, wherein the contact is a compressive contact and further comprising maintaining the composition under compression between the housing and the substrate.

3. A method according to claim 2, wherein the molecular weight of the triblock copolymer is about 150,000 to about 300,000.

4. A method according to claim 3 wherein the composition comprises a hydrocarbon oil having the molecular weight of about 400 to about 2,000.

5. A method according to claim 4 wherein the plasticizer comprises a hydrocarbon oil having the solubility parameter of about 6.0 to 8.0.

* * * * *